(12) United States Patent
Huang et al.

(10) Patent No.: US 11,415,228 B2
(45) Date of Patent: Aug. 16, 2022

(54) WATER OUTLET VALVE STRUCTURE AND HUMIDIFIER HAVING THE SAME

(71) Applicant: GREE ELECTRIC APPLIANCES, INC. OF ZHUHAI, Guangdong (CN)

(72) Inventors: Zhongping Huang, Zhuhai (CN); Yihong Zhang, Zhuhai (CN); Zhenhua Lin, Zhuhai (CN); Zhicong Chen, Zhuhai (CN); Gang Liang, Zhuhai (CN); Jiandong Bai, Zhuhai (CN); Yuliang Xu, Zhuhai (CN); Jianhua Zhang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 17/059,149

(22) PCT Filed: Dec. 25, 2018

(86) PCT No.: PCT/CN2018/123325
§ 371 (c)(1),
(2) Date: Nov. 25, 2020

(87) PCT Pub. No.: WO2020/042488
PCT Pub. Date: Mar. 5, 2020

(65) Prior Publication Data
US 2021/0199200 A1 Jul. 1, 2021

(30) Foreign Application Priority Data

Aug. 27, 2018 (CN) .......................... 201810978815.5
Aug. 27, 2018 (CN) .......................... 201810978890.1

(51) Int. Cl.
*F16K 1/38* (2006.01)
*F16K 1/46* (2006.01)
(Continued)

(52) U.S. Cl.
CPC .................. *F16K 1/38* (2013.01); *F16K 1/46* (2013.01); *F16K 21/18* (2013.01); *F16K 31/22* (2013.01);
(Continued)

(58) Field of Classification Search
CPC ... F16K 1/38; F16K 1/46; F16K 1/443; F16K 21/18; F16K 21/185; F16K 31/088;
(Continued)

(56) References Cited

U.S. PATENT DOCUMENTS 2,831,497 A * 4/1958 Skerritt .................... F16K 31/18
137/436
2,893,427 A * 7/1959 Felgate .................... F16K 31/42
137/625.27

(Continued)

FOREIGN PATENT DOCUMENTS

CN       2138723 Y      7/1993
CN     101235904 A      8/2008
(Continued)

OTHER PUBLICATIONS

Extended European Search Report for European Application No. 18932141.7 dated Jun. 2, 2021 (38 pages).
International Search Report for Application No. PCT/CN2018/123325 dated May 31, 2019 (3 pages).

*Primary Examiner* — Mary E McManmon
*Assistant Examiner* — Andrew J Rost
(74) *Attorney, Agent, or Firm* — Brandon V. Zuniga; James R. Gourley; Carstens & Cahoon, LLP

(57) ABSTRACT

Water outlet valve structure and a humidifier having the same. Opening or closing of the water outlet valve structure is controlled by a control structure. The water outlet valve structure includes a flow channel including an inlet and an outlet. The control structure is capable of sealing or opening the outlet of the flow channel. The outlet of the flow channel (Continued)

is capable of being sealed or opened by the control structure of the water outlet valve structure, to control the open and close of the flow channel, thereby simplifying the water outlet valve structure. In a further aspect, since only the outlet is sealed, specific requirements for the structure of the control structure are relatively low, thereby allowing the control structure to be simplified.

17 Claims, 3 Drawing Sheets

(51) Int. Cl.
*F16K 21/18* (2006.01)
*F16K 31/22* (2006.01)

(52) U.S. Cl.
CPC .... *Y10T 137/7475* (2015.04); *Y10T 137/7485* (2015.04)

(58) Field of Classification Search
CPC .......... F16K 31/22; F16K 31/26; F16K 33/00; F16K 24/044; F16K 24/042; F16K 24/048; F16K 31/18; F16K 31/20; F24F 2006/008; Y10T 137/7485; Y10T 137/7475
USPC .................................................. 137/448, 445
See application file for complete search history.

(56) References Cited

U.S. PATENT DOCUMENTS

| | | | | |
|---|---|---|---|---|
| 3,508,574 | A * | 4/1970 | Skerritt | F24F 6/04 137/451 |
| 3,630,221 | A * | 12/1971 | Wilson | A01K 7/04 137/448 |
| 3,726,303 | A * | 4/1973 | Allen | F16K 31/26 137/205 |
| 3,741,239 | A * | 6/1973 | Riddiford | F16K 31/088 137/408 |
| 4,453,563 | A * | 6/1984 | Walters | A01K 7/025 137/414 |
| 5,080,126 | A * | 1/1992 | De Rycke | F16T 1/24 137/195 |
| 5,445,143 | A | 8/1995 | Sims | |
| 6,138,709 | A | 10/2000 | Home | |
| 8,033,291 | B2 * | 10/2011 | Randolph | F16K 21/18 137/429 |
| 9,353,879 | B2 * | 5/2016 | Jones | F16K 24/048 |
| 9,982,602 | B2 * | 5/2018 | Carpenter | F16K 39/02 |

FOREIGN PATENT DOCUMENTS

| | | |
|---|---|---|
| CN | 103742656 A | 4/2014 |
| CN | 106481867 A | 3/2017 |
| CN | 106642477 A | 5/2017 |
| CN | 108413543 A | 8/2018 |
| CN | 108825803 A | 11/2018 |
| CN | 108825804 A | 11/2018 |

* cited by examiner

WATER OUTLET VALVE STRUCTURE AND HUMIDIFIER HAVING THE SAME

CROSS-REFERENCE TO RELATED APPLICATIONS

This application claims priorities to China Patent Application No. 201810978815.5, filed on Aug. 27, 2018, entitled "WATER OUTLET VALVE STRUCTURE AND HUMIDIFIER HAVING THE SAME", and China Patent Application No. 201810978890.1, filed on Aug. 27, 2018, entitled "WATER OUTLET VALVE STRUCTURE AND HUMIDIFIER HAVING THE SAME", the contents of which are hereby incorporated by reference. This application is a national phase under 35 U S C. § 120 of international patent application PCT/CN2018/123325, entitled "WATER OUTLET VALVE STRUCTURE AND HUMIDIFIER HAVING THE SAME" filed on Dec. 25, 2018 and published as WO 2020/042488 on Mar. 5, 2020, the content of which is also hereby incorporated by reference. Every patent application and publication listed in this paragraph is hereby incorporated by reference in its entirety.

TECHNICAL FIELD

The present disclosure relates to the technical field involving water outlet valves, and more particularly to a water outlet valve structure and a humidifier having the same.

BACKGROUND

An electrical appliance such as a humidifier, which is provided with a water tank, may have a water outlet valve structure disposed at a water outlet of the water tank to control water outflow. Currently, most of common water outlet valve structures for the water tanks of the humidifiers on the market are mono-seal structures. The water outlet valve structure for the water tank is usually provided with a sealing structure at a water inlet of the valve. Most of manufacturers select and use this kind of water outlet valve structure for its simple structure as well as low manufacturing and assembly costs.

SUMMARY

In view of the above, the present disclosure provides a water outlet valve structure, and a humidifier having the water outlet valve structure.

In a first aspect, a water outlet valve structure is provided. Open or close of the water outlet valve structure is controlled by a control structure. The water outlet valve structure includes a flow channel including an inlet and an outlet. The control structure is capable of sealing or opening the outlet of the flow channel.

In some embodiments, a water storage structure is disposed below the outlet of the flow channel; the control structure includes a floating portion disposed in the water storage structure; the floating portion is capable of rising or descending with a liquid level in the water storage structure,
when the liquid level rises to a seal location, the floating portion seals the outlet of the flow channel; and
when the liquid level descends, the floating portion descends, and the outlet of the flow channel is open.

In some embodiments, a water outflow structure is disposed at the outlet of the flow channel; the water outflow structure has a sealing portion; the sealing portion has a water outlet; the sealing portion is capable of abutting against the control structure, thereby having the water outlet sealed by the control structure.

In some embodiments, the water outlet valve structure further includes a housing and a valve core assembly. The flow channel is located in the housing. The valve core assembly is capable of moving between an open position and a closed position to open or close the flow channel. The control structure is capable of controlling the valve core assembly in a non-contact manner through controlling the valve core assembly to move from the closed position to the open position.

In some embodiments, the valve core assembly includes a first magnetic member; the control structure includes a second magnetic member disposed at a portion corresponding to the valve core assembly; a magnetic force generated between the first magnetic member and the second magnetic member is capable of controlling the valve core assembly to move.

In some embodiments, the flow channel includes a water inflow channel and a water outflow channel; the water inflow channel is a tubular structure of which a first end is an opening and a second end is sealed; one end of the water outflow channel is in communication with the water inflow channel, and another end of the water outflow channel constitutes an outlet of the water outflow channel; an included angle is formed between an extension direction of the water inflow channel and an extension direction of the water outflow channel.

In some embodiments, the control structure is a lever structure including a first side structure located on one side of a fulcrum and a second side structure located on another side of the fulcrum; the valve core assembly is capable of opening or closing the first end of the water inflow channel; the first side structure is opposite to the valve core assembly, and is capable of driving the valve core assembly to move from the closed position to the open position; the second side structure is opposite to the outlet of the water outflow channel, and is capable of sealing the outlet of the water outflow channel.

In some embodiments, the first end of the water inflow channel and the outlet of the water outflow channel are capable of being simultaneously opened or simultaneously sealed.

In some embodiments, the valve core assembly seals the first end of the water inflow channel when the valve core assembly is located at the closed position; the first side structure is capable of providing a pushing force to move the valve core assembly upward to the open position, thereby opening the first end of the water inflow channel.

In some embodiments, a water outflow structure is disposed at the outlet of the flow channel; the water outflow structure has a sealing portion; the sealing portion has a water outlet; the sealing portion is capable of abutting against a portion of the second side structure, thereby sealing the water outlet.

In some embodiments, the water outlet faces downward; the sealing portion is located at a lower side of the water outflow structure.

In some embodiments, the water outflow structure further includes a mounting portion inserted into the flow channel from the outlet of the flow channel; the mounting portion and the sealing portion constitute an L-shaped structure, and form an L-shaped flow channel in the water outflow structure.

In some embodiments, a joining portion is formed on aside wall of the mounting portion; a notch is formed on a side wall of the water outflow channel; the joining portion is capable of being inserted into and snap-fitted with the notch during mounting.

In some embodiments, the lever structure is a float including a floating portion and a driving portion, the floating portion constitutes the second side structure, and the driving portion constitutes the first side structure.

In a second aspect, a water outlet valve structure is provided. Open or close of the water outlet valve structure is controlled by a control structure. The water outlet valve structure includes a housing and a valve core assembly. A flow channel is located in the housing. The valve core assembly is capable of opening or closing a first end of the flow channel; the control structure is capable of driving the valve core assembly to move from a closed position to an open position, and the control structure is capable of sealing an outlet of the flow channel.

In some embodiments, the first end and the outlet of the flow channel are capable of being simultaneously opened or simultaneously sealed; and/or, when the first end of the flow channel is unable to be closed by the valve core assembly, the outlet of the flow channel is capable of being sealed by the control structure.

In some embodiments, the control structure is a lever structure including a first side structure located on one side of a fulcrum and a second side structure located on another side of the fulcrum; the first side structure is opposite to the valve core assembly, and is capable of driving the valve core assembly to move from the closed position to the open position; the second side structure is opposite to the outlet of the flow channel, and is capable of sealing the outlet of the flow channel.

In some embodiments, a water outflow structure is disposed at the outlet of the flow channel; the water outflow structure has a sealing portion; the sealing portion has a water outlet; the sealing portion is capable of abutting against a portion of the second side structure, thereby sealing the water outlet.

In some embodiments, the water outlet faces downward; the sealing portion is located at a lower side of the water outflow structure.

In some embodiments, the water outflow structure further includes a mounting portion inserted into the flow channel from the outlet of the flow channel; the mounting portion and the sealing portion constitute an L-shaped structure, and form an L-shaped flow channel in the water outflow structure.

In some embodiments, the flow channel includes a water inflow channel and a water outflow channel; an included angle is formed between an extension direction of the water inflow channel and an extension direction of the water outflow channel.

In some embodiments, the water inflow channel is a tubular structure; a first end of the water inflow channel is an opening, and a second end of the water inflow channel is sealed; the first end of the water inflow channel constitutes the first end of the flow channel.

In some embodiments, the valve core assembly seals the first end of the water inflow channel when the valve core assembly is located at the closed position; the first side structure is capable of providing a pushing force to move the valve core assembly upward to the open position, thereby opening the first end of the water inflow channel.

In some embodiments, the water outlet valve structure includes a blocking portion capable of deforming, the second end of the water inflow channel is sealed by the blocking portion; the first side structure provides the pushing force to the valve core assembly in a contact manner.

In some embodiments, the blocking portion includes a blocking cover and a mounting structure, the blocking cover seals the second end of the water inflow channel, the blocking cover is made of a flexible material, and the mounting structure fixes the blocking cover to the housing.

In some embodiments, the mounting structure is an annular structure; the first side structure is capable of being in contact with the blocking cover and capable of providing the pushing force to deform the blocking cover.

In some embodiments, the lever structure is a float including a floating portion and a driving portion, the floating portion constitutes the second side structure, and the driving portion constitutes the first side structure.

In a third aspect, a humidifier is provided. The humidifier includes a water tank and a water reservoir having a float disposed therein, and includes the above-described water outlet valve structure disposed at a water outlet of the water tank.

According to the water outlet valve structure provided in the present disclosure, the outlet of the flow channel is capable of being sealed or opened by the control structure, to control the open and close of the flow channel, thereby simplifying the water outlet valve structure. Moreover, since only the outlet is sealed, the specific requirement to the structure of the control structure is relatively low, thereby allowing the control structure to be simplified as well.

BRIEF DESCRIPTION OF THE DRAWINGS

The above and other features and advantages of the present disclosure will become more apparent from the following description of embodiments of the disclosure with reference to the accompanying drawings, in which.

DETAILED DESCRIPTION OF THE EMBODIMENTS

The present disclosure is described below on the basis of the embodiments, but is not limited to these embodiments. It should be understood by one of ordinary skill in the art that the drawings provided herein are merely for illustrative purposes, and are not necessarily drawn to scale.

Unless specifically required in the context, the terms "comprise", "include" and the like throughout the specification and claims are to be interpreted as inclusive rather than exclusive or exhaustive, that is, as the meaning of "include but is not limited to".

In the description of the present disclosure, it should be understood that the terms "first", "second" and the like are merely used for descriptive purposes, and should not be interpreted to indicate or imply relative importance. Furthermore, in the description of the present disclosure, unless otherwise stated herein, the term "a plurality of" means two or more.

A water outlet valve structure provided in the present disclosure is disposed at a water outlet of a water tank, and is capable of controlling a water outflow of the water tank. The water outlet valve structure is particularly suitable for an electrical appliance such as a humidifier.

The present disclosure provides a water outlet valve structure which includes a flow channel. The flow channel includes an inlet and an outlet. The outlet is disposed opposite to a water storage structure. Water can flow into the flow channel from the inlet, and then flow out from the outlet and into the water storage structure. The water storage structure is located below the outlet. The outlet is capable of being sealed by a control structure. In some embodiments, the control structure includes a floating portion disposed in the water storage structure. The floating portion is capable of rising or descending with a liquid level in the water storage structure. When the liquid level in the water storage structure rises to a certain height, the floating portion is in contact with the outlet and seals the outlet. At this time, the location of the liquid level is a seal location, that is, once the liquid level rises to reach this location, the floating portion seals the outlet. When the liquid level in the water storage structure descends, the floating portion descends, so that the floating portion is separated from the outlet, and the outlet is open. In some embodiments, in the present embodiment, the control structure is not limited to a specific structure as long as a portion of the control structure is capable of rising or descending with the liquid level.

Figure 2:
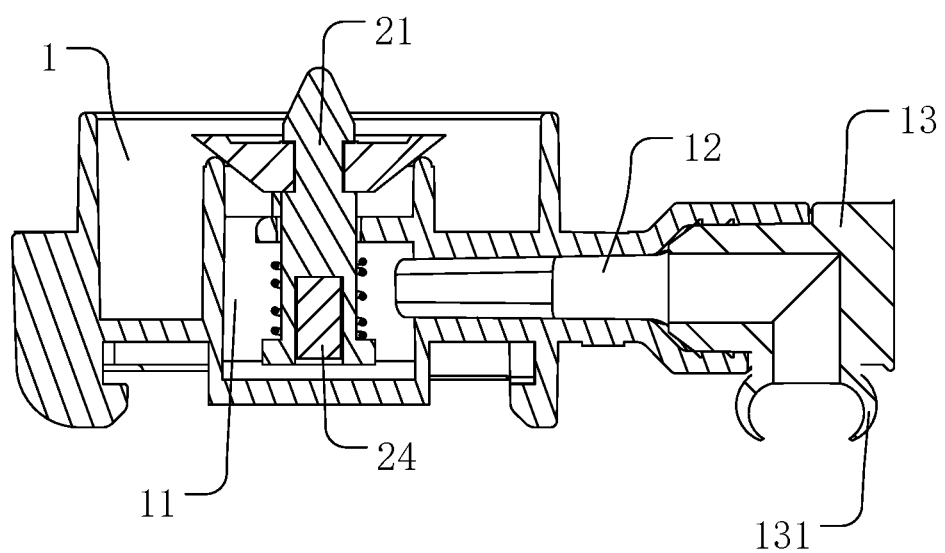
FIG. 2 is a schematic cross-sectional view of a water outlet valve structure according to a second embodiment of the present disclosure.
Figure 3:
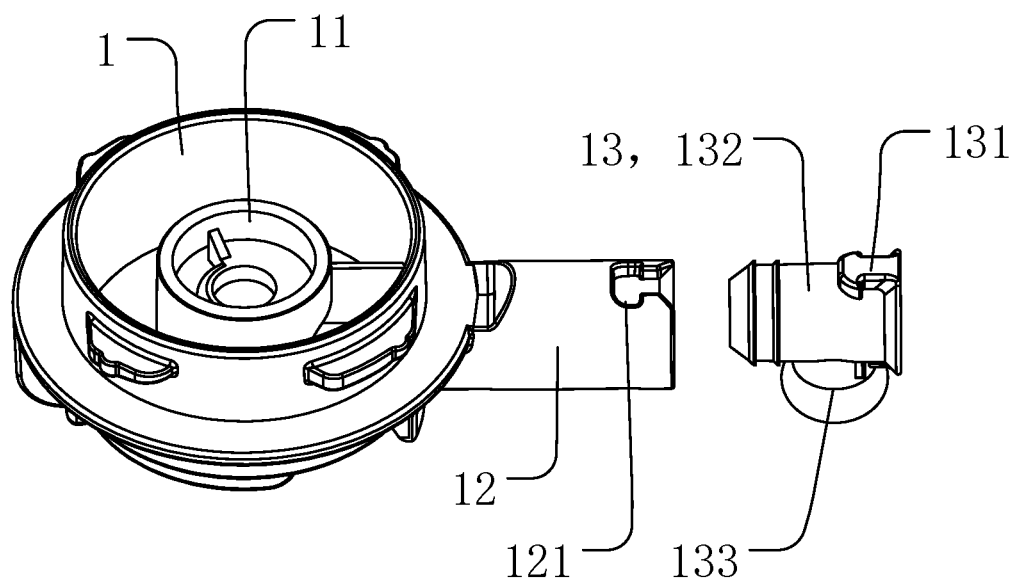
FIG. 3 is a schematic structural view of a housing and a water outlet structure.

In some embodiments, a sealing structure is disposed at the outlet to improve the sealing effect. In some embodiments, a water outflow structure 13 is disposed at the outlet (as shown in FIGS. 1, 2, and 3), and a specific structure of the water outflow structure 13 is described in detail below.

In some embodiments, in order to further improve the reliability of the water outlet valve structure, the present disclosure also provides another water outlet valve structure which is a dual seal structure.

Figure 1:
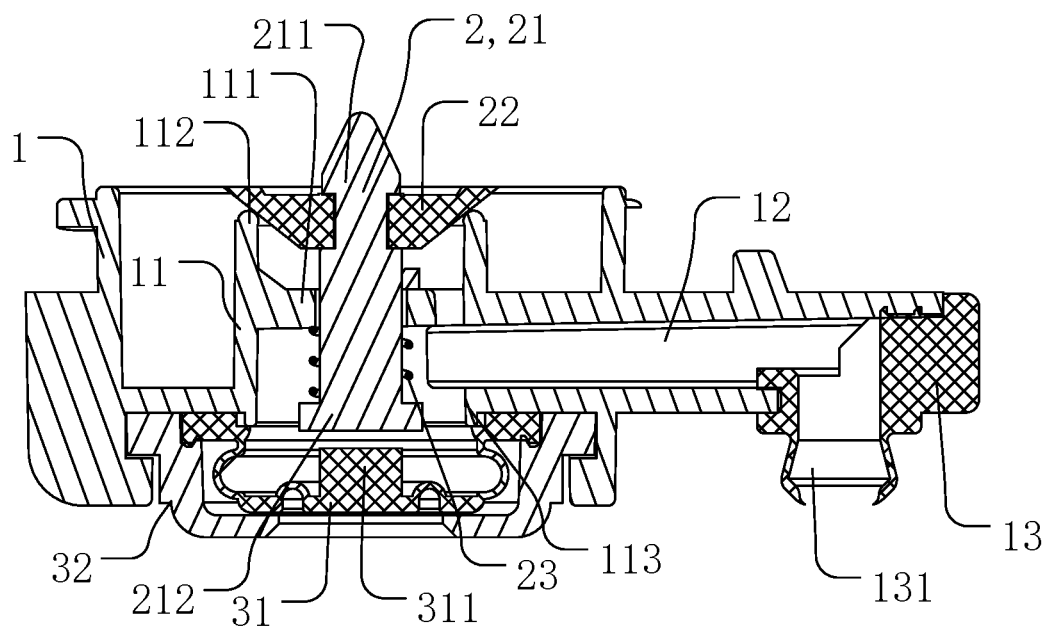
FIG. 1 is a schematic cross-sectional view of a water outlet valve structure according to a first embodiment of the present disclosure.

As shown in FIG. 1, in a first embodiment of the water outlet valve structure, the water outlet valve structure includes a housing 1 and a valve core assembly 2. A water inflow channel 11 is located in the housing 1. A portion of the structure of the valve core assembly 2 is movably disposed in the water inflow channel 11. The open and close of the water inflow channel 11 is capable of being controlled via the valve core assembly 2. The housing 1 is also provided with a water outflow channel 12. Water can flow in the housing 1 from the water inflow channel 11 and then flow out from the housing 1 through the water outflow channel 12. An included angle is formed between a flowing direction of the water flow in the water inflow channel 11 and a flowing direction of the water flow in the water outflow channel 12. In some embodiments, the included angle is 90 degrees, that is, the water inflow channel 11 and the water outflow channel 12 are perpendicular to each other.

The housing 1 is substantially in a shape of a cylindrical structure. The water inflow channel 11 is a tubular structure, and is located at an inner side along a radial direction of the housing 1. In some embodiments, an axis of the water inflow channel 11 is parallel to or collinear with an axis of the housing 1. The valve core assembly 2 includes a valve core 21 and a sealing portion 22. The valve core 21 is a rod-shape structure, and is capable of being slidably inserted into the water inflow channel 11 in an axial direction of the water inflow channel 11. A radial dimension of the valve core 21 is smaller than a radial dimension of an inner wall of the water inflow channel 11, so that a gap is formed between the valve core 21 and the inner wall of the water inflow channel 11 to allow the water to flow in the water inflow channel 11. The sealing portion 22 is a disk-shape structure or a table-shape structure. A size of an end surface of the sealing portion 22 is larger than a size of an end portion of the water inflow channel 11, so that the sealing portion 22 is capable of sealing a first end 112 of the water inflow channel 11. The first end 112 is an upper end of the water inflow channel 11 in a working state. A mounting hole is disposed in the sealing portion 22. In some embodiments, the mounting hole is located at the center of the sealing portion 22. A first end 211 of the valve core 21 is capable of passing through the mounting hole, allowing the sealing portion 22 to be joined on the valve core 21. The sealing portion 22 is joined on a position adjacent to the first end 211 of the valve core 21, and is not capable of moving relative to the valve core 21 in an axial direction of the valve core 21. A mounting groove is disposed at the position adjacent to the first end 211 of the valve core 21 in the axial direction of the valve core 21. A diameter of the mounting hole of the sealing portion 22 is smaller than an outer diameter of the valve core 21, and is smaller than or larger than an outer diameter of a surface at which a bottom wall of the mounting groove locates, so as to achieve a snap-fit connection between the mounting groove and the mounting hole matching with each other, and to restrict the location of the sealing portion 22 in the axial direction of the valve core 21. The mounting groove and the mounting hole are in sealing contact with each other, thereby preventing water leakage at the position of the joint between the valve core 21 and the sealing portion 22. In some embodiments, the sealing portion 22 is made of a soft material such as rubber. Further, a side wall of a portion of the valve core 21 between the first end 211 and the mounting groove forms a conical surface which guides the mounting of the sealing portion 22, to facilitate the mounting of the sealing portion 22.

A second end 212 of the valve core 21, that is, an end away from the sealing portion 22, is inserted into the water inflow channel 11 from the first end 112 of the water inflow channel 11, and is capable of being moved downward. When the valve core 21 is moved to a first position, the sealing portion 22 is in contact with the first end 112 of the water inflow channel 11; at this time, the valve core 21 cannot slide downward any further, and the sealing portion 22 tightly abuts against the first end 112 of the water inflow channel 11, so as to seal the first end 112 of the water inflow channel 11; that is, the valve core assembly 2 is at a closed position that makes the first end 112 of the water inflow channel 11 closed. The valve core assembly 2 further includes a biasing member 23 which provides a biasing force that enables the valve core 21 to be maintained at the first position without being subjected to an external force, and enables the valve core 21 to provide a pre-tightening force to the sealing portion 22, so that the sealing portion 22 is capable of being tightly pressed against the first end 112 of the water inflow channel 11, thereby ensuring a sealing effect. In some embodiments, at the first position, the second end 212 of the valve core 21 is adjacent to a second end 113 of the water inflow channel 11, or the second end 212 of the valve core 21 is extended out from the water inflow channel 11. By exerting an upward pushing force on the second end 212 of the valve core 21 in the axial direction of the valve core 21 to overcome the biasing force of the biasing member 23, the valve core 21 together with the sealing portion 22 is capable of being moved upward to an open position, thereby opening the water inflow channel 11. After removing the pushing force, due to the biasing force of the biasing member 23 as well as the gravities of the valve core 21 and the sealing portion 22, the valve core 21 and the sealing portion 22 are moved downward to the first position, and the sealing portion 22 seals the water inflow channel 11.

A guide structure 111 is disposed in the water inflow channel 11, and supports and guides the sliding movement of the valve core 21. In order to avoid an effect of the guide structure 111 on water flow, a structure for water passing is formed on the guide structure 111. For example, the guide structure 111 is a plate-shape structure. An outer edge of the plate-shape structure is connected to the inner wall of the water inflow channel 11. A guide hole is disposed in the plate-shape structure. The valve core 21 passes through the guide hole and slide along the axial direction. A water-passing hole is disposed in the plate-shape structure and is configured to have water flowing therethrough. Alternatively, the guide structure 111 includes a guide ring cooperating with the valve core 21. The guide ring is connected to the inner wall of the water inflow channel 11 through a connecting rib. A plurality of connecting ribs are provided. Gaps are formed between the connecting ribs and are configured to have water flowing therethrough. In some embodiments, the biasing member 23 is a spring wound on the valve core 21, and one end of the biasing member 23 abuts against the guide structure 111; a limiting portion protruded radially is formed on the second end of the valve core 21, and another end of the biasing member 23 abuts against the limiting portion. In some embodiments, when the valve core 21 is at the first position, the biasing member 23 is also capable of providing an elastic force downward in the axial direction of the valve core 21 for the valve core 21, that is, the biasing member 23 has a certain amount of compression, so as to ensure that the sealing portion 22 is tightly pressed against the first end 112 of the water inflow channel 11, thereby ensuring the reliability of sealing the first end 112 of the water inflow channel 11 with the sealing portion 22.

The water outflow channel 12 is in communication with the water inflow channel 11, and is configured to flow the water out from the housing 1. In some embodiments, the water outflow channel 12 extends in the radial direction of the housing 1.

Accordingly, a blocking portion is disposed in the housing 1, and seals the second end 113 of the water inflow channel 11, to prevent water from flowing out from the second end 113 of the water inflow channel 11. Specifically, in the present embodiment, the blocking portion includes a blocking cover 31. The blocking cover 31 is made of a flexible material. For example, the blocking cover 31 is a corrugated cover being capable of deforming under an external force. The blocking cover 31 seals the second end 113 of the water inflow channel 11. The blocking cover 31 has a convex block 311 formed at the side of the blocking cover 31 adjacent to the valve core 21. The blocking cover 31 is deformed when it is subjected to an upward pushing force, so that the convex block 311 is in contact with the valve core 21 and then pushes the valve core 21 to move upward. In some embodiments, the convex block 311 is a convex structure formed on the blocking cover 31, and is configured to reduce a distance between the blocking cover 31 and the valve core 21, so that the convex block 311 is able to push the valve core 21 to move by having a small deformation. The blocking portion also includes a mounting structure 32. The blocking cover 31 is fixed to the housing 1 by the mounting structure 32. In some embodiments, the mounting structure 32 is a cover-shape structure. A through hole is formed at a central position of the cover-shape structure, and a pressure is capable of being applied to the blocking cover 31 through the through hole. Alternatively, the mounting structure 32 is an annular structure, and is capable of tightly pressing an edge of the blocking cover 31 against the housing 1. In some embodiments, the mounting structure 32 is detachably connected to the housing 1. For example, the mounting structure 32 is connected to the housing 1 via means such as threaded connection or buckle connection. Alternatively, the mounting structure 32 is integrally formed with the housing 1 to reduce the assembly steps.

A flow channel outlet is formed at the end of the water outflow channel 12 away from the water inflow channel 11, and is provided with the water outflow structure 13. The water outlet is formed on the water outflow structure 13, and is configured to flow the water out. In some embodiments, the water outlet faces downward. In some embodiments, the water outflow structure 13 has a sealing portion 131, and the sealing portion 131 is located at a lower side of the water outflow structure 13. The sealing portion 131 has a water outlet. The sealing portion 131 is made of a flexible material such as rubber, and is capable of being elastically deformed when subjected to a pressure. Further, the water outflow structure 13 is made of a flexible material such as rubber to facilitate installation of the water outflow structure 13.

As shown in FIG. 3, in some embodiments, the water outflow structure 13 includes a mounting portion 132 and a sealing portion 131. The mounting portion 132 and the sealing portion 131 constitute an L-shaped structure, and form an L-shaped flow channel therein. The mounting portion 132 is inserted into the water outflow channel 12 and forms an interference fit with the water outflow channel 12. In some embodiments, a joining portion 133 is formed on a side wall of the mounting portion 132. A notch 121 is formed on a side wall of the water outflow channel 12. The joining portion 133 is capable of being inserted into and snap-fitted with the notch 121 during mounting. The notch 121 is in a structure that a size of an opening of the notch 121 is smaller than a size of an inner space of the notch 121. The shape of the joining portion 133 matches the shape of the notch 12. The joining portion 133 is deformed and then snap-fitted with the notch 121 during mounting.

In some embodiments, the mounting structure 32, the water outflow channel 12, and the water outflow structure 13 are an integrated structure; the water inflow channel 11 and the housing 1 are an integrated structure.

Figure 4:
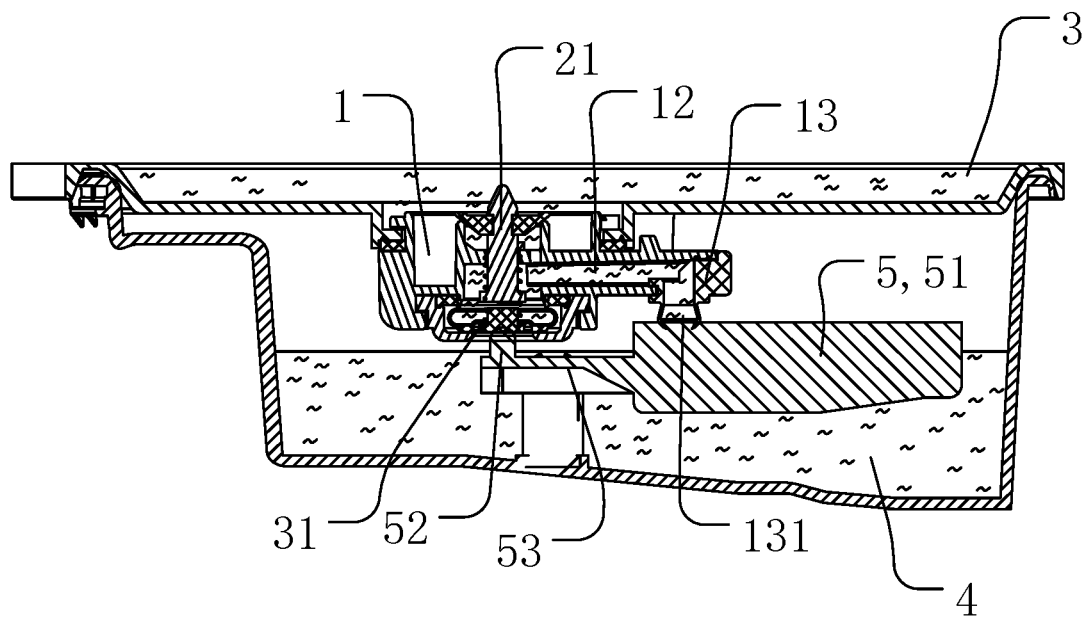
FIG. 4 is a schematic, partial cross-sectional view of a humidifier according to a first embodiment.

As shown in FIG. 4, when the water outlet valve structure is applied in a humidifier, the water outlet valve structure is mounted to a water outlet of a water tank 3. The water tank 3 is mounted on a water reservoir 4. Water in the water tank 3 is capable of flowing into the water reservoir 4 through the water outlet valve structure. In some embodiments, the housing 1 of the water outlet valve structure and the water tank 3 is an integrated structure, that is, the housing 1 is integrated with the water tank 3. A float 5 is disposed in the water reservoir 4, and includes a floating portion 51 and a driving portion 52. The floating portion 51 is capable of rising or descending with the liquid level in the water reservoir 4. The driving portion 52 is capable of pushing the valve core 21 to move upward. The floating portion 51 and the driving portion 52 are spaced apart by a certain distance and connected through a connecting portion 53. A fulcrum is formed on connecting portion 53, and is rotatably connected to an inner side of water reservoir 4, so that the float 5 constitutes a lever structure. The driving portion 52 constitutes a first side structure of the lever structure. The first side structure is opposite to the valve core assembly 2 and capable of applying a pushing force on the valve core assembly 2. The floating portion 51 constitutes a second side structure of the lever structure. The second side structure is capable of sealing the water outlet of the water outflow structure 13. When the liquid level in the water reservoir 4 is relatively low, the floating portion 51 descends, and the driving portion 52 rises, and the driving portion 52 pushes the blocking cover 31 thereby deforming the blocking cover 31 and pushing the valve core 21 to move upward, so that the water in the water tank 3 flows into the water reservoir 4. When the floating portion 51 rises as the liquid level in the water reservoir 4 rises, the driving portion 52 descends, so that the valve core 21 descends. When the valve core 21 moves to the first position, the water inflow channel 11 is sealed, and the water is not able to continue to flow into the water reservoir 4. At this time, an upper surface of the floating portion 51 is in contact with the sealing portion 131, so that the water outlet of the water outflow structure 13 is capable of being sealed. When the valve element assembly 2 fails, the water inflow channel 11 is not able to be sealed. At this time, the water level in the water reservoir 4 will continuously rise. Once the water level rises to a certain position, the floating portion 51 contacts with the sealing portion 131 and applies a pressure to the sealing portion 131, so that the water outlet is sealed, and the water is not able to continue to flow into the water reservoir 4, thereby preventing water overflow.

In some embodiments, a sealing structure is disposed on the floating portion 51, and is a structure such as a sealing ring, a sealing gasket and the like. Once the floating portion 51 rises to a certain height with the water level, the sealing structure of the floating portion 51 is in contact with the water outlet of the water outflow structure 13 to seal the water outlet. In this case, the water outflow structure 13 is provided with the sealing portion 131 matching the sealing structure, so as to facilitate the sealing effect. Alternatively, the sealing portion 131 is omitted.

Figure 5:
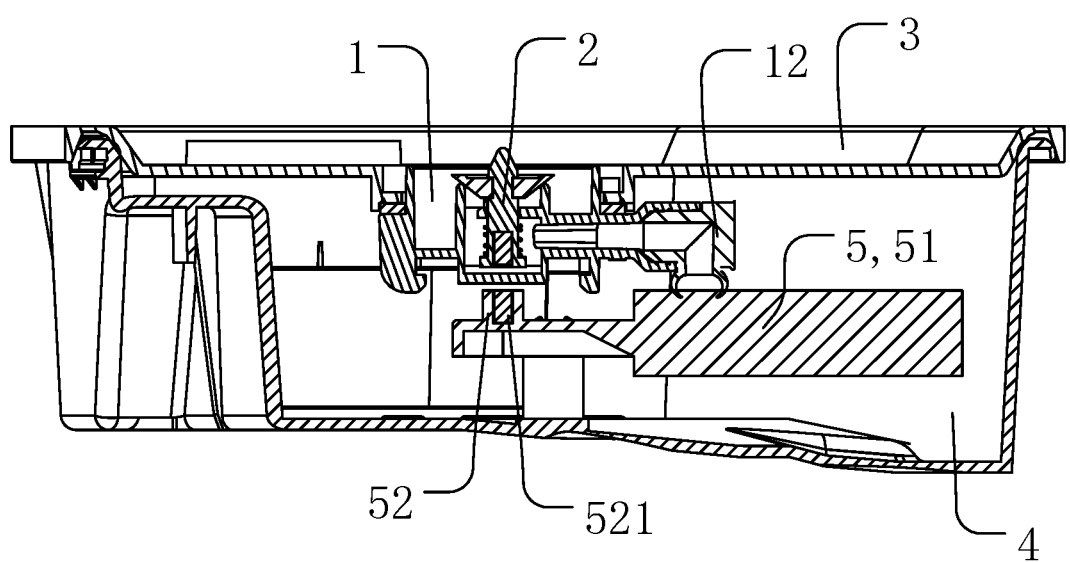
FIG. 5 is a schematic, partial cross-sectional view showing a humidifier according to a second embodiment.

As shown in FIG. 2 and FIG. 5, in a second embodiment, the second end 113 of the water inflow channel 11 is a sealed end, that is, the blocking portion and the water inflow channel 11 are integrally formed at the second end 113 of the water inflow channel 11. The water inflow channel 11 is a tubular structure of which the first end 112 is an opening and the second end 113 is sealed. The second end 212 of the valve core 21 is located in the water inflow channel 11, and is provided with a first magnetic member 24. Correspondingly, in the present embodiment, a second magnetic member 521 is disposed on the driving portion 52 of the float 5. The first magnetic member 24 and the second magnetic member 521 are capable of generating a repulsive force, so that the valve core 21 is pushed upward when the driving portion 52 is close to the valve core 21. In some embodiments, the first magnetic member 24 and the second magnetic member 521 are both magnets. The same polarities of the first magnetic member 24 and the second magnetic member 521 are face-to-face disposed during mounting.

The water outlet valve structure provided in the present disclosure is provided with the water outflow channel. The water outflow structure is disposed at the end of the water outflow channel, and is capable of cooperating with the float in the water reservoir. Once the water level is high, the float seals the water outlet of the water outflow structure. Therefore, the water outlet valve structure has the dual-seal structure which is the sealing of the water inflow channel by the valve core assembly and the sealing of the water outlet by the float, so that the reliability of the water outlet valve structure is improved.

It will be readily understood by those skilled in the art that the above-mentioned various embodiments can be freely combined or superimposed without conflict.

It should be understood that the above-mentioned various embodiments are merely illustrative and not restrictive. Those skilled in the art can make various obvious or equivalent modifications or alterations with respect to the above-mentioned details without departing from the basic principles of the present disclosure, and these modifications or alterations will all fall within the scope of the claims of the present disclosure.

What is claimed is:

1. A water outlet valve structure, wherein:
   the water outlet valve structure comprises a control structure, opening or closing of the water outlet valve structure is controlled by the control structure, the water outlet valve structure comprises a flow channel comprising an inlet and an outlet, and the control structure is capable of sealing or opening the outlet of the flow channel;
   the water outlet valve structure further comprises a housing and a valve core assembly, the flow channel is located in the housing, the valve core assembly is capable of moving between an open position and a closed position to open or close the flow channel, the control structure is capable of controlling the valve core assembly in a non-contact manner through controlling movement of the valve core assembly from the closed position to the open position;
   the flow channel comprises a water inflow channel and a water outflow channel; the water inflow channel is a tubular structure of which a first end is an opening and a second end is sealed; one end of the water outflow channel is in communication with the water inflow channel, and another end of the water outflow channel constitutes an outlet of the water outflow channel; an included angle is formed between an extension direction of the water inflow channel and an extension direction of the water outflow channel; and
   the control structure is a lever structure comprising a first side structure located on one side of a fulcrum and a second side structure located on another side of the fulcrum; the valve core assembly is capable of opening or closing the first end of the water inflow channel; the first side structure is opposite to the valve core assembly, and is capable of driving the valve core assembly to move from the closed position to the open position, and the second side structure is opposite to the outlet of the water outflow channel, and is capable of sealing the outlet of the water outflow channel.

2. The water outlet valve structure according to claim 1, wherein:
   a water storage structure is disposed below the outlet of the flow channel; the control structure comprises a floating portion disposed in the water storage structure; the floating portion is capable of rising or descending with a liquid level in the water storage structure;
   when the liquid level rises to a seal location, the floating portion seals the outlet of the flow channel; and
   when the liquid level descends, the floating portion descends, and the outlet of the flow channel is open.

3. The water outlet valve structure according to claim 1, comprising a water outflow structure disposed at the outlet of the flow channel; wherein, the water outflow structure has a sealing portion;
the sealing portion has a water outlet; and
the sealing portion is capable of abutting against the control structure, thereby having the water outlet sealed by the control structure.

4. The water outlet valve structure according to claim 1, wherein:
the valve core assembly comprises a first magnetic member;
the control structure comprises a second magnetic member disposed at a portion corresponding to the valve core assembly; and
a magnetic force generated between the first magnetic member and the second magnetic member is capable of controlling movement of the valve core assembly.

5. The water outlet valve structure according to claim 1, wherein:
the first end of the water inflow channel and the outlet of the water outflow channel are capable of being simultaneously opened or simultaneously sealed.

6. The water outlet valve structure according to claim 1, wherein:
the valve core assembly seals the first end of the water inflow channel when the valve core assembly is located at the closed position; and
the first side structure is capable of providing a pushing force to move the valve core assembly upward to the open position, thereby opening the first end of the water inflow channel.

7. The water outlet valve structure according to claim 1, comprising a water outflow structure disposed at the outlet of the flow channel; wherein:
the water outflow structure has a sealing portion;
the sealing portion has a water outlet; and
the sealing portion is capable of abutting against a portion of the second side structure, thereby sealing the water outlet.

8. The water outlet valve structure according to claim 7, wherein:
the water outlet faces downward; and
the sealing portion is located at a lower side of the water outflow structure.

9. The water outlet valve structure according to claim 7, wherein
the water outflow structure further comprises a mounting portion inserted into the flow channel from the outlet of the flow channel; and
the mounting portion and the sealing portion constitute an L-shaped structure, and form an L-shaped flow channel in the water outflow structure.

10. The water outlet valve structure according to claim 9, wherein:
a joining portion is formed on a side wall of the mounting portion;
a notch is formed on a side wall of the water outflow channel; and
the joining portion is capable of being inserted into and snap-fitted with the notch during mounting.

11. The water outlet valve structure according to claim 1, wherein:
the lever structure is a float comprising a floating portion and a driving portion;
the floating portion constitutes the second side structure; and
the driving portion constitutes the first side structure.

12. The water outlet valve structure according to claim 1, wherein:
the valve core assembly is capable of opening or closing a first end of the flow channel; and
the control structure is capable of driving the valve core assembly to move from a closed position to an open position.

13. The water outlet valve structure according to claim 12, wherein:
the second side structure is opposite to the outlet of the flow channel, and is capable of sealing the outlet of the flow channel.

14. The water outlet valve structure according to claim 13, comprising a blocking portion capable of deforming; wherein:
the first end of the water inflow channel constitutes the first end of the flow channel;
the second end of the water inflow channel is sealed by the blocking portion; and
the first side structure provides a pushing force to the valve core assembly in a contact manner.

15. The water outlet valve structure according to claim 14, wherein:
the blocking portion comprises a blocking cover and a mounting structure;
the blocking cover seals the second end of the water inflow channel;
the blocking cover is made of a flexible material; and
the mounting structure fixes the blocking cover to the housing.

16. The water outlet valve structure according to claim 15, wherein:
the mounting structure is an annular structure; and
the first side structure is capable of being in contact with the blocking cover and capable of providing the pushing force to deform the blocking cover.

17. A humidifier, comprising a water tank, a water storage structure, and the water outlet valve structure according to claim 1; wherein:
the water outlet valve structure is disposed at a water outlet of the water tank, and the water storage structure has the control structure disposed therein.

* * * * *